(12) United States Patent
Klokow

(10) Patent No.: US 10,702,873 B2
(45) Date of Patent: Jul. 7, 2020

(54) METHOD AND AIR-SWEPT VERTICAL MILL FOR GRINDING HOT, WET RAW MATERIAL AND ALSO CHANNEL-LIKE SEGMENT

(71) Applicant: LOESCHE GmbH, Duesseldorf (DE)

(72) Inventor: Alexander Klokow, Duesseldorf (DE)

(73) Assignee: LOESCHE GmbH, Duesseldorf (DE)

( * ) Notice: Subject to any disclaimer, the term of this patent is extended or adjusted under 35 U.S.C. 154(b) by 643 days.

(21) Appl. No.: 15/317,058

(22) PCT Filed: Jun. 2, 2015

(86) PCT No.: PCT/EP2015/062212
§ 371 (c)(1),
(2) Date: Dec. 7, 2016

(87) PCT Pub. No.: WO2015/193100
PCT Pub. Date: Dec. 23, 2015

(65) Prior Publication Data
US 2017/0120252 A1    May 4, 2017

(30) Foreign Application Priority Data
Aug. 12, 2014 (EP) .................... 14180695

(51) Int. Cl.
*B02C 15/00* (2006.01)
*B02C 15/04* (2006.01)
*B02C 23/24* (2006.01)

(52) U.S. Cl.
CPC .......... *B02C 15/001* (2013.01); *B02C 15/00* (2013.01); *B02C 15/007* (2013.01); *B02C 15/04* (2013.01);
(Continued)

(58) Field of Classification Search
CPC ..... B02C 15/001; B02C 15/00; B02C 15/007; B02C 15/04; B02C 23/24; B02C 2015/002; Y02P 40/20
See application file for complete search history.

(56) References Cited

U.S. PATENT DOCUMENTS 4,009,992 A   3/1977 Eicke
4,597,537 A   7/1986 Misaka et al.
(Continued)

FOREIGN PATENT DOCUMENTS

CN   101252997 A   8/2008
CN   101918141 A   12/2010
(Continued)

OTHER PUBLICATIONS

International Search Report dated Oct. 7, 2015 related to PCT/EP2015/062212 filed Jun. 2, 2015.
Chinese First Office Action & Search Report dated Apr. 26, 2018 relating to CN Patent Application No. 201580002246.5.
Japanese Patent Application No. 2016-571729, Notice of Reasons for Refusal, dated Apr. 18, 2019.

*Primary Examiner* — Omar Flores Sanchez
(74) *Attorney, Agent, or Firm* — Dinsmore & Shohl LLP

(57) ABSTRACT

The invention relates to a method for milling hot and wet raw materials, in particular cement clinker, in a vertical airflow mill (1), to a vertical airflow mill (1), to a device (10) for supplying cooling gas, and to corresponding channel-like segments (20). The device (10) for supplying cooling gas is configured in an annular manner about the entire circumference of the vertical airflow mill (1). Inlet (21) and outlet openings (24) for the cooling gas have an adapted surface which allows an equalization of the inflow cooling air into an increasing airflow/milling particle mixture.

17 Claims, 2 Drawing Sheets

(52) U.S. Cl.
CPC ........ *B02C 23/24* (2013.01); *B02C 2015/002* (2013.01); *Y02P 40/20* (2015.11)

(56) References Cited

U.S. PATENT DOCUMENTS

| | | | |
|---|---|---|---|
| 2006/0071104 A1* | 4/2006 | Montag | B02C 23/12 |
| | | | 241/23 |
| 2010/0043675 A1 | 2/2010 | Lohle et al. | |
| 2016/0121336 A1* | 5/2016 | Yalin | B02C 15/006 |
| | | | 241/117 |
| 2016/0199844 A1* | 7/2016 | Arima | B07B 7/086 |
| | | | 241/47 |
| 2018/0099288 A1* | 4/2018 | Hoffmann | B02C 15/006 |
| 2018/0372313 A1* | 12/2018 | Kashima | B02C 15/001 |

FOREIGN PATENT DOCUMENTS

| | | |
|---|---|---|
| CN | 102112231 A | 6/2011 |
| CN | 203711091 U | 7/2014 |
| DE | 102005040519 A1 | 3/2007 |
| EP | 579214 A1 | 6/1997 |
| EP | 1675683 A1 | 7/2006 |
| JP | 57140658 | 8/1982 |
| JP | H5-7785 | 1/1993 |
| JP | 2003265974 A | 9/2003 |
| JP | 2011529385 | 12/2011 |
| JP | 201418749 | 2/2014 |
| WO | 2007/022837 A1 | 3/2007 |

\* cited by examiner

METHOD AND AIR-SWEPT VERTICAL MILL FOR GRINDING HOT, WET RAW MATERIAL AND ALSO CHANNEL-LIKE SEGMENT

The invention relates to a method for grinding hot, wet raw material, in particular cement clinker, and also to an air-swept vertical mill, in particular for carrying out the method, and to a device for supplying cooling gas as well as channel-like segments.

Air-swept vertical mills for grinding hot, wet raw material, for example hot cement clinker or raw coal, are known for example from EP 0 579 214 A1 or EP 1 675 683 A1.

In DE-AS 23 61 060, besides a grinding-drying of raw meal in an air-swept roller mill, a cooling-grinding of cement clinker in an air-swept roller mill downstream of a rotary kiln is described.

Another method and a device for grinding hot, wet cement clinker are indicated in EP 1 922 149 B1.

There it is pointed out that, when grinding hot cement clinker in a temperature range of approximately 120° C. with slag and wet aggregates in vertical mills, the required cooling and drying gases have a negative effect with regard to their function as transport gases. On the one hand, hot gas at a sufficiently high temperature of approximately 180° C. must be supplied in order that the drying process of the raw material can take place in the short term in the grinding and transport phase.

On the other hand, cooling gas, in particular fresh air, must be mixed in a controlled manner with the hot gas and the transport gas rising in the vertical mill in order to achieve the desired defined output temperature for the fines after the classifier.

It is thereby frequently necessary to carry out a water injection into the grinding chamber in order to reduce the temperature of the raw material or ground material.

Since, in the case of a water injection into the grinding chamber, there is an increased energy requirement for the necessary vaporisation of the cooling water, all in all the efficiency of the grinding-drying process in the vertical mill is worsened. Thus, in summary, an impairment of the cement quality is also to be expected.

In order to manage these problems to some extent it is proposed in EP 1 922 149 B1 to provide swirl boxes that can be regulated in the upper vertical mill part above the grinding rollers, by means of which swirl boxes fresh air can be introduced as cooling gas extensively tangentially into the vertical mill and the rising transport gas. These known swirl boxes also have swirl flaps, with which the cooling gas is guided in a regulated manner and extensively tangentially into the vertical mill.

In spite of the improvements achieved through these measures in relation to the previously addressed problems, in particular also avoiding a water injection as cooling medium to reduce the temperature of the raw material, these measures have not completely proved themselves.

In particular it has been ascertained that the hot transport gas conveyed from below into the vertical mill, which conveys the air flow—grinding particle mixture upwards with a swirl flow, is influenced in a strand-like manner by the cooling air flow flowing in via the swirl boxes. This means that strands and different temperature ranges are present in the rising air flow—grinding particle mixture, so that the classification process provided in the upper region of the vertical mill is also impaired. This influences the classified fines, as different temperature ranges are present in the fines in the outlet region from the vertical mill. On the other hand this measure can lead to an extensively point-based inflow of cooling air via the swirl boxes, and the formation of strands in the rising air flow—grinding particle mixture also leads to non-smooth running of the vertical mill. This can impair the product quality of the fines but can also cause a greater energy consumption.

In U.S. Pat. No. 4,597,537 A an air-swept vertical mill is described, wherein an annular gap is provided around the grinding table for the inflow of hot air or cooling air. To improve the fluid flow and the speed thereof, on the one hand a device for supplying cooling gas can be provided in the region of the classifier, wherein the cooling gas is introduced tangentially into the housing surrounding the classifier. On the other hand a further supply line of gas into the return cone for grit can also be considered below the classifier in order to be able to regulate the throughput rate to improve the classification of the ground particles.

It is thus the object of the invention to design a method for grinding hot, wet raw material, especially hot cement clinker, and an air-swept vertical mill suitable for this more efficiently and to avoid the previously mentioned disadvantages, so that a reliable product quality is secured, and the corresponding measures also allow a subsequent incorporation into existing vertical mills.

This object is achieved by a method and by a device having the features of the air-swept vertical mill, wherein a device for supplying cooling gas is proposed that has channel-like segments.

An essential core idea of the invention can be seen in carrying out an inflow of cooling gas, in particular cooling air, over the whole inner circumference of an air-swept vertical mill, so that an extensively even temperature reduction is achieved in the rising volume cross-section of the air flow—grinding particle mixture. For this, the cooling air is injected in a ring-shaped manner around the whole inner circumference of the housing of an air-swept vertical mill. This is preferably realised radially and in particular approximately horizontally in the housing of the air-swept vertical mill.

The inflow of the cooling air can also be realised with a tangentially and possibly slightly rising component, so that at the same time as the cooling of the air flow—grinding particle mixture, swirl reinforcement is achieved for the rising mixture.

In particular the radial inflow of the cooling air causes an intensive, rapid mixing with the rising hot air flow—grinding particle mixture so that a rapid, even cooling of the air flow grinding—particle mixture is also achieved.

In order to achieve extensively equal pressure and flow conditions in the ring-shaped introduction of the cooling gas, the cooling gas introduced over the whole circumference of the housing of the air-swept vertical mill is supplied via a plurality of segment sections. The individual segment sections are impinged in the region of their inlet openings with cooling gas at the same pressure and flow volume, so that the relatively high temperature of the rising air flow—grinding particle mixture can hereby be cooled substantially steadily and uniformly.

It has been shown that the number of segment sections approximately in the range of three to six segments is sufficient in order to achieve evening-out of the temperature reduction. However, more segments can also be provided.

In principle, an annular inflow of cooling gas with only one single or also two half rings is also conceivable. However, it is to be noted in this case that the outflow conditions of the cooling gas into the rising air flow—grinding particle mixture must be kept the same. This can be achieved by the impinging of the cooling gas with pressure as it enters into the ring or half ring and via the surface of the outflow openings on the ring or half ring.

Fresh air or ambient air or also cooled air or process gas are preferably used as the cooling gas.

Hot cement clinker, which is optionally supplied with slag and aggregates within the scope of a cement production as raw material of the air-swept vertical mill and subsequently ground and dried and thereby has a temperature in the range of from approximately 90° C. to 120° C., can be evenly cooled with the discussed measures to a defined temperature suitable for the further processing of in particular approximately 70° C.

For the uniform cooling of the rising air flow—grinding particle mixture, the cooling gas is introduced in channel-type manner into the provided segment sections or segments and via a plurality of outlet openings with a respectively approximately equal outflow volume into the air-swept vertical mill.

The desired, defined outlet temperature of the fines after the classifier can hereby be optimally regulated by means of the temperature and the volume of cooling gas introduced.

An air-swept vertical mill is particularly suited to carry out the method. This has in the conventional manner a rotating grinding table, on which the raw material to be ground, for example hot cement clinker, is guided in a grinding bed, on which grinding rollers are provided that roll thereon. Such an air-swept vertical mill has in the region of the grinding table a surrounding annular gap, in which a blade ring for upwardly flowing hot and transport gas is arranged. In the upper region of such an air-swept vertical mill, a dynamic classifier is preferably provided, which classifies the rising air flow—grinding particle mixture into fines and grit, whereby the latter is recirculated via a return cone approximately centrally onto the grinding table.

Above the grinding rollers a device for supplying cooling gas to reduce the temperature of the upwardly guided fines and grit is provided.

This device for supplying cooling gas is provided in the upper region of the air-swept vertical mill in a ring-type manner and circumferentially on or in the housing. This is suitably realised by means of a plurality of channel-like segments in order to achieve an even, preferably radial introduction of cooling gas, wherein the channel-like segments are provided equally spaced apart over the circumference of the housing.

These channel-like segments can be designed for example in contact with each other as ring-shaped segments with an arc region of approximately 60°. Six of such channel-like segments then usefully form the corresponding device for discharging the cooling air.

Smaller ring segments have the advantage of improved evening-out of the cooling air blown into the inner chamber of the vertical mill.

It has, however, also been shown that an extensively regular and good temperature cooling of the rising air flow—grinding particle mixture can be achieved with for example three channel-like segments which are connected via short intermediate segments and not directly adjoins to each other. This is extensively determined by the orientation of lamellas provided in the channel-like segments, which preferably defines a radial outflow direction of the cooling air.

The plurality of channel-like segments for forming the device for supplying cooling air are arranged equally spaced apart and with equal extension around the circumference of the housing of the vertical mill.

Due to its construction, the device for supplying cooling air can also be subsequently incorporated into existing plants and vertical mills relatively easily. At the level of the arrangement of the device in relation to the housing a surrounding gap is substantially required in the housing, into which the ring-shaped device with its channel-like segments and especially the inner regions with the outlet openings thereof can be incorporated or in particular welded.

The channel-like segments of the device for supplying cooling air each have an inlet opening for supplied cooling air and preferably a plurality of inwardly directed, in particular radially inwardly directed, lateral outlet openings. The area of the respective inlet opening of a channel-like segment thereby usefully corresponds approximately to the sum of the areas of the outlet openings of the segment or is designed to be slightly greater, in particular approximately 5 to 10% greater.

The inlet opening of the respective channel-like segment is thereby connected to a supply line for the cooling air. A separate fan is suitably provided for this, which draws in ambient air or fresh air and discharges it into the channel-like segments.

Insofar as the air-swept vertical mill is operated in negative pressure, for example by means of a fan downstream of the classifier, no individual fans for the channel-like segments are required, but instead the negative pressure generated inside the mill is sufficient for the required cooling air inflow.

The adjacent channel-like segments can usefully abut against each other and be interconnected or somewhat spaced apart from each other, wherein a connecting segment is then provided in a circular ring shape between adjacent segments.

The device, formed by means of the channel-like segments, for supplying cooling gas can have for example three directly adjacent or somewhat spaced apart from each other channel-like segments, which extend over an arc region of from 60° to 100° or 120°, whereby by means of corresponding connecting segments a closed circular ring-shaped arrangement is usually created.

The device for supplying cooling gas overall is adapted to the incorporation cross-section for the device at the level of the incorporation point in the housing of the vertical mill.

To improve the regulation capacity of the cooling gas or the cooling air supplied, the inlet openings of the channel-like segments have controllable shutter flaps. It is hereby possible for the flow volume of the cooling air introduced into the inner chamber to be regulated in a targeted manner.

Approximately six channel-like segments with a ring-shaped arrangement are preferably used, wherein these segments extend approximately over 60° and directly join each other.

The direct joining is facilitated by the inner radius of the channel-like segments in the region of the outlet openings being somewhat smaller than the outer radius of the arc segment of a channel-like segment. On the one hand the direct passage and the abutment of the regions with the outlet openings can hereby be realised, while the supply line for the inlet openings of the channel-like segments is spaced apart from the circular ring shape due to the somewhat larger outer radius.

The channel-like segments, which are designed as part of the device for supplying cooling gas, are advantageously designed approximately in a tipped edge shape from the inlet opening for the cooling gas to the closed end of the segment, wherein a ring-shaped inner circle segment has the outlet openings for the cooling gas.

The outlet openings of the channel-like segments preferably have the same opening cross-section, which facilitates evening-out of the inflow of the cooling air.

For simplification and improved regulation, the inlet opening of the channel-like segments can be designed to be approximately rectangular and in particular square, and be provided with controllable shutter flaps, in order to control the cooling air flow supplied via the opening cross-section.

The channel-like segments can also have a circular or other cross-section, which allows simplified manufacture.

The device for supplying cooling gas, which can also be incorporated as an add-on part in a vertical mill, thus has a plurality of, in particular three or six, channel-like segments which are connected to each other to form a rigid ring shape.

The invention will be described below by reference to schematic figures and two exemplary embodiments. The drawings show:

FIG. 1 a vertical section through an air-swept vertical mill, wherein the known components are shown with broken lines and the device for supplying cooling gas in the upper region of the vertical mill is schematically drawn in with solid lines;

Figure 1:
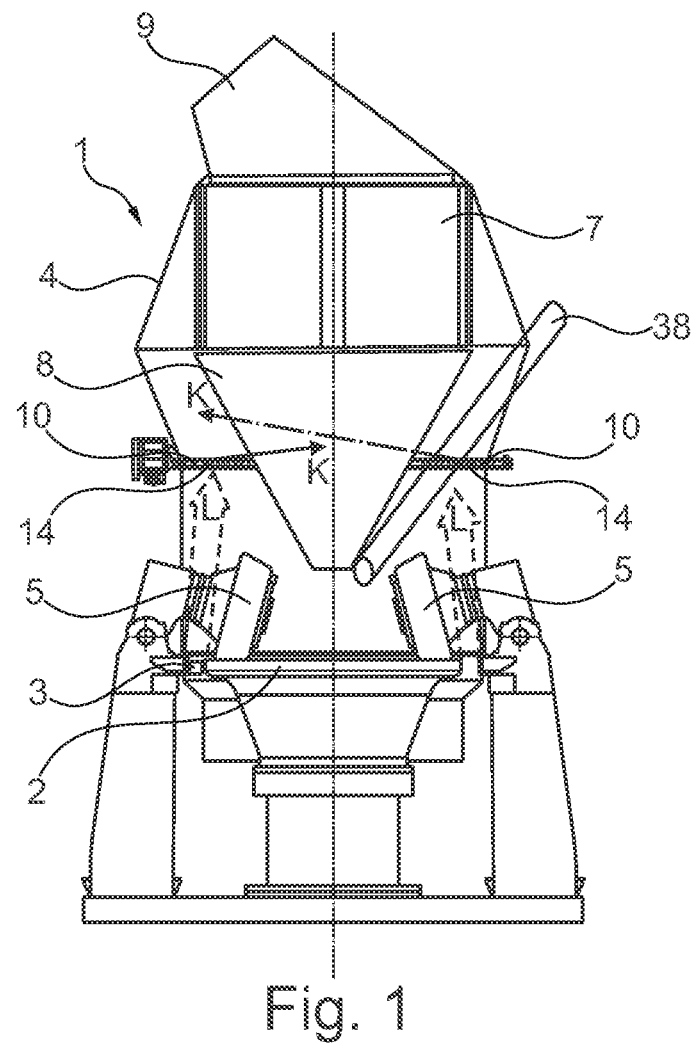

In FIG. 1 an air-swept vertical mill 1 in the vertical section with its substantial components is shown. A rotationally drivable grinding table 2 is arranged in the lower region of the air-swept vertical mill 1, which grinding table 2 is surrounded by a ring duct, in which a blade ring 3 is arranged. The essential air and hot gas flow for the transport and drying of an upwardly guided air flow—grinding particle mixture L is incorporated through this blade ring 3 through an inclined orientation. On the grinding table 2, a grinding track of hot, wet raw material is formed, on which in the example two grinding rollers 5 are shown and roll thereon frictionally. It is also possible to provide more grinding rollers, e.g. four or six.

The air-swept vertical mill 1 is surrounded by a housing 4, wherein in the upper region a dynamic classifier 7 is incorporated, downwards from which a return cone 8 for grit rejected from the classifier 7 is arranged.

The supply of the raw material is realised via a tubular feed means 38 approximately into the centre of the grinding table 2.

The raw material ground by means of the rollers 5 is guided as air flow—grinding particle mixture L usually in a swirl-like flow upwards into the upper part of the air-swept vertical mill 1.

In order to achieve, in the case of over-ground, hot cement clinker in the temperature region of approximately 100° C., a temperature reduction to approximately 70° C., a substantially horizontally arranged ring-shaped device 10 is provided in the upper region of the air-swept vertical mill 1 to supply cooling gas K. By means of this device 10, the cooling air or ambient air blown in as cooling gas K can be guided in very evenly around the whole inner circumference of the housing 4, wherein this is preferably realised radially with approximately horizontal orientation.

This has the advantage of achieving a better mixing and thus a more targeted, more rapid cooling of the rising air flow—grinding particle mixture L.

This is indicated by the arrows with K. The flow K shown with the solid line is hereby to run in the front region of the return cone 8, while the rear-side cooling air flow indicated with K is indicated with a "dot-line".

By means of the cooling air blown in by means of the device 10 the invention facilitates an extensively even temperature reduction of the rising air flow—grinding particle mixture L for example to the temperature in the region of 70° C. desired in the case of ground cement clinker. This temperature reduction by means of the ring-shaped device 10 allows an extensively strand-free air flow—grinding particle mixture L, which is fed to the classifier 7. It is hereby possible to achieve desired, defined fines at the fines outlet 9, in particular with respect to the temperature which is suited for the further processing.

Although only two grinding rollers 5 are shown in FIG. 1, it is known to the person skilled in the art to also provide a plurality of grinding rollers.

Figure 2:
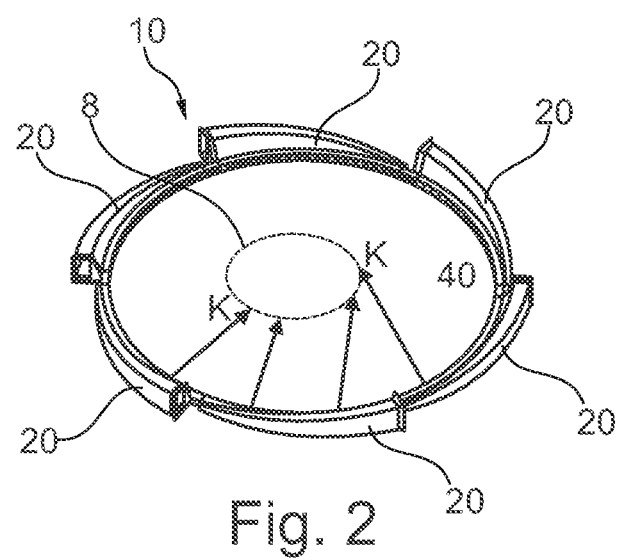
FIG. 2 shows a simplified perspective view of a device for supplying cooling gas with six channel-like segments adjacent to each other.
Figure 3:
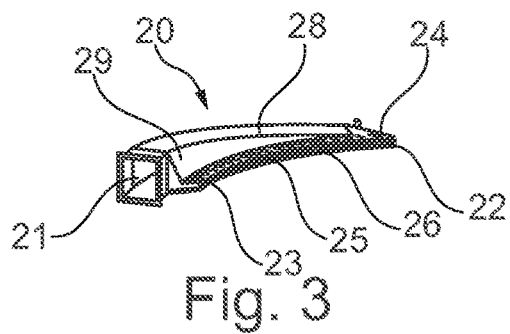
FIG. 3 shows a perspective view of a single channel-like segment with a view on the outlet openings at the inner contour of the ring-shaped arrangement.

As FIG. 1 only shows the schematic illustration of a device 10 for supplying cooling air, FIG. 2 shows in a slightly perspective view the ring-shaped formation of six channel segments 20 arranged in series to form a ring 40 over 360°. The channel-like ring segments 20 thereby form an arc segment of approximately 60°. With respect to an individual channel-shaped segment 20, reference is made to FIG. 3, in which further details are shown.

The channel-shaped segment 20 has an approximately square inlet opening 21 for the cooling air and merges towards the segment end provided in the right region into a channel closure 24 with a tipped wedge shape 28, wherein the inner cross-sectional area constantly reduces, while the outlet openings 22, 23 provided on the inner radial region have approximately the same opening areas.

Through the lamellas 26 provided at the inner edge between the upper and lower side the flow and inclination direction of the outflowing cooling air can be set, whereby a radial flow direction is preferred.

The configuration of a channel-like segment 20 is usually adapted to the factors of the corresponding air-swept vertical mill 1 and specially designed for it so that the orientation of the lamellas 26 is specified and these can be welded.

In other desired cases, however, these lamellas 26 can also be designed to be adjustable at different setting angles or inclination angles.

Figure 4:
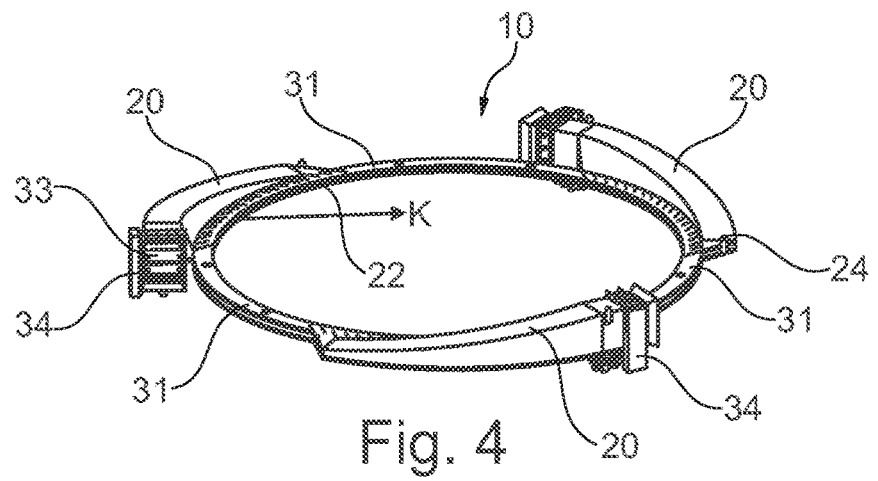
FIG. 4 shows a perspective view of a device for supplying cooling gas with three channel-like segments and a view on an inlet opening of a segment.
Figure 5:
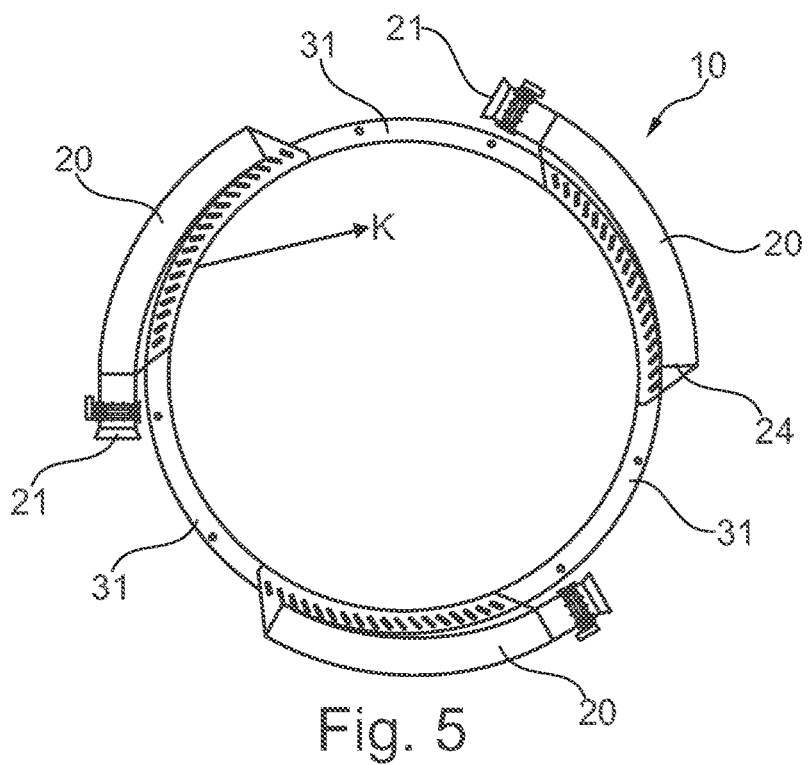
FIG. 5 shows a top view of the device according to FIG. 4.

The transition from the square cross-section of the channel-shaped segment 20 into the inner edge region is realised via a side wall 29 falling in an inclined manner, so that the inlet opening 21 is slightly outwardly offset in comparison with the inner edge 25, and thus in a device 10, as shown in FIGS. 4, 5, also a separate supply line for the cooling air to each individual inlet opening 21 is made possible.

According to FIG. 4, a device 10 for supplying cooling gas is shown in a perspective view with three channel-like segments 20. These channel-like segments 20 extend approximately over a range of from 80° to 100° and are connected to each other by means of connecting segments 31 to form a rigid ring over 360°.

In the example according to FIG. 4, shutter flaps 33 are provided in the inlet opening 21, which facilitate by means of a control means 34 the adjustment of the cross-sectional area for the inlet opening 21. On the other hand it can be seen that the channel-like segments 20 have a tipped wedge form 28 for evening out the pressure and flow conditions for the inwardly exiting cold air K.

In FIG. 5 schematically in a top view the example of the device 10 according to FIG. 4 for supplying cooling gas is shown. The same reference numerals relate to the same components in all figures.

FIGS. 4 and 5 thus show that a device 10 for supplying cooling gas K can also be realised with three channel-like segments 20, insofar as in terms of volume and direction the cooling air incorporated via the segments and the outlet openings 22, 23 thereof can be guided into the rising air flow—grinding particle mixture L, in order to be able to supply a strand-free air flow—grinding particle mixture L to the classifier 7.

The device 10 according to the invention for supplying cooling air is thus also usable for a subsequent incorporation into already existing vertical mills, wherein in principle in the upper part of the mill housing 4 a surrounding annular gap 14 is incorporated, into which the device 10 with its channel-like segments 20 and in particular the inner edges 25 thereof must be inserted and rigidly connected to the edges of the housing 4.

In the examples of the figures the inflow direction of the cooling gas K from the segments 20 into the free annular space between the housing 4 and the return cone 8 is provided approximately radially and extensively horizontally. In consideration of empirical results an inflow direction of the cooling gas K orientated approximately tangentially to the return cone 8 can be advantageous in certain applications, optionally also with a slight vertical flow component.

The ring-shaped device 10 for supplying cooling air thus facilitates a target temperature reduction for defined fines, in particular cement clinker fines, optionally with aggregates and slag, wherein the corresponding grinding and classification process facilitates a substantial improvement of the product quality and an improvement in the overall energy balance.

The invention claimed is:

1. A method for grinding hot, wet raw material, in an air-swept vertical mill,
   wherein the raw material is fed to the air-swept vertical mill, ground therein and at the same time dried by means of a hot gas supplied in the lower part of the air-swept vertical mill, and fed to a classifying into defined, channeled out fines and recirculated grit in the upper part of the air-swept vertical mill,
   wherein by means of a cooling gas introduced in the upper part of the air-swept vertical mill before the classifying a temperature reduction of the air flow-grinding particle mixture fed upwards to the classifying to a defined outlet temperature of the fine material after the classifying is carried out
   wherein:
      the cooling gas is introduced approximately annularly and with substantially radial inflow direction into the air-swept vertical mill and the air flow-grinding particle mixture guided upwards to the classifying; and
      the ring-shaped introduction of the cooling gas is carried out over a plurality of segment sections.

2. The method according to claim 1, wherein: the segment sections comprise three to six segment sections.

3. The method according to claim 1, wherein: fresh air or cooled air is introduced as cooling gas.

4. The method according to claim 1, wherein: ground and extensively dried cement clinker is cooled from a temperature in the range of from 90° C. to 100° C. by means of the cooling gas to a temperature of the fines of the cement clinker in the range of 70° C.

5. The method according to claim 2, wherein: the cooling gas is introduced in channel-shape into the segment sections and introduced via a plurality of outlet openings each having approximately the same outflow volume into the air-swept vertical mill.

6. The method according to claim 1, wherein: the defined outlet temperature of the fines is regulated by means of the temperature and the introduced volume of the cooling gas.

7. An air-swept vertical mill,
   having a rotating grinding table with raw material to be ground to fines and grit, and grinding rollers grinding thereof,
   having a ring surrounding the grinding table for upwardly flowing hot and transport gas,
   having a classifier provided in the upper region of the air-swept vertical mill- and a return cone arranged below for recirculated grit, and
   having a device, provided above the grinding rollers, for supplying cooling gas to reduce the temperature of the fines and grit guided upwards with the hot and transport gas to a defined discharge temperature, wherein the device for supplying cooling gas is provided in a ring-shaped manner in the upper region of the air-swept vertical mill circumferentially on or in the housing, to carry out the method according to claim 1,
   wherein:
      the ring surrounding the grinding table is designed as a blade ring, and the device for supplying cooling gas has a plurality of channel segments for even, substantially radial introduction of cooling gas, which are equally spaced apart around the circumference of the housing of the air-swept vertical mill.

8. The air-swept vertical mill according to claim 7, wherein:
   the channel segments each have an inlet opening for supplied cooling gas and a plurality of inwardly orientated side outlet openings, and
   the area of the inlet opening of a segment corresponds approximately to the sum of the areas of the outlet openings of this segment or is designed to be slightly larger.

9. The air-swept vertical mill according to claim 7, wherein: adjacent channel segments are interconnected in abutment with each other or spaced apart in a circular ring shape via a respective connecting segment.

10. The air-swept vertical mill according to claim 7, wherein: the inlet openings of the channel segments have controllable shutter flaps to regulate the flow of the cooling gas.

11. The air-swept vertical mill according to claim 7, wherein: the cooling gas is fresh air, cooled air or cool process air.

12. A channel segment as part of a device for supplying cooling gas into an air-swept vertical mill according to claim 7, wherein:
   the channel segment has a tapering form from the inlet opening for the cooling gas towards the closed end of the channel segment, preferably a tipped wedge form, with a part ring shaped inner arc segment, and
   the outlet openings for the cooling gas are provided in the part ring shaped inner arc segment.

13. The channel segment according to claim 12, wherein: the outlet openings have an approximately equal opening area.

14. The channel segment according to claim 12, wherein:
the inlet opening is designed to be approximately rectangular, in particular square or circular, and
the opening cross-section can be changed by means of controllable shutter flaps.

15. A device for supplying cooling gas, having a plurality of channel segments built together according to claim 12.

16. The method according to claim 1, wherein the substantially radial inflow direction of the cooling gas has a tangential or slightly upwardly oriented flow component.

17. The method according to claim 1, wherein the segment sections comprise more than six segment sections.

* * * * *